US00RE44597E

(19) United States
(12) Reissued Patent
Litwin

(10) Patent Number: US RE44,597 E
(45) Date of Reissued Patent: Nov. 12, 2013

(54) SIMULTANEOUS NATIONWIDE UPDATE OF DATABASE INFORMATION ON MOBILE COMMUNICATIONS DEVICES

(71) Applicant: Thomson Licensing, Issy de Moulineaux (FR)

(72) Inventor: Louis Robert Litwin, East Windsor, NJ (US)

(73) Assignee: Thomson Licensing, Boulogne-Billcourt (FR)

(21) Appl. No.: 13/740,332

(22) Filed: Jan. 14, 2013

Related U.S. Patent Documents

Reissue of:
(64) Patent No.: 8,019,317
Issued: Sep. 13, 2011
Appl. No.: 10/121,404
Filed: Apr. 12, 2002

(51) Int. Cl.
*H04Q 7/20* (2006.01)

(52) U.S. Cl.
USPC ..... 455/403; 455/422.1; 455/550.1; 455/564; 455/414.1; 455/412.1; 379/207.14; 379/207.15; 379/201.01

(58) Field of Classification Search
USPC ..... 455/403, 422.1, 416, 518, 519, 500, 455/517, 412.1, 412.2, 550.1, 564, 575.1, 455/414.1–414.4, 558; 379/207.14, 207.15, 379/201.01
See application file for complete search history.

(56) References Cited

U.S. PATENT DOCUMENTS

| | | | |
|---|---|---|---|
| 6,128,483 | A | 10/2000 | Doiron et al. |
| 6,539,238 | B1 | 3/2003 | Brouns et al. |
| 6,658,455 | B1 | 12/2003 | Weinman, Jr. |
| 6,993,355 | B1 | 1/2006 | Pershan |
| 2001/0034244 | A1 | 10/2001 | Calder et al. |
| 2002/0023132 | A1 | 2/2002 | Tornabene et al. |
| 2002/0049049 | A1 | 4/2002 | Sandahl et al. |
| 2002/0090933 | A1 | 7/2002 | Rouse et al. |
| 2002/0161771 | A1 | 10/2002 | Boshko |
| 2002/0173319 | A1 | 11/2002 | Fostick |

(Continued)

FOREIGN PATENT DOCUMENTS

| | | |
|---|---|---|
| EP | 0917077 | 5/1999 |
| JP | 7-38957 | 2/1995 |

(Continued)

OTHER PUBLICATIONS

TIA/EIA-777 Telecommunications, Telephone Terminal Equipment, Caller Identity and Visual Massage Waiting Indicator Equipment Performance Requirements; Table of Contents/pp. 1-48.

(Continued)

*Primary Examiner* — Keith Ferguson
(74) *Attorney, Agent, or Firm* — Robert D. Shedd

(57) ABSTRACT

A system and method for supporting updates of database contact information to mobile communications devices includes a system having a data entry computer for compiling database contact information for a group of mobile communications devices, a service provider computer server in signal communication with the data entry computer for uploading the database contact information into the service provider computer server and for downloading the database contact information substantially simultaneously to the group of mobile communications devices, and a mobile communications device in signal communication with the service provider computer server for receiving the database contact information and for updating its own global logical database; wherein the method for supporting updates of database contact information to mobile communications devices includes the steps of compiling database contact information for a group of mobile communications devices, uploading the database contact information to a service provider computer server, and downloading the database contact information to the group of mobile communications devices.

24 Claims, 3 Drawing Sheets

(56) References Cited

U.S. PATENT DOCUMENTS

| | | | |
|---|---|---|---|
| 2002/0196923 | A1 | 12/2002 | Donnelly |
| 2003/0008674 | A1 | 1/2003 | Cudak et al. |
| 2003/0157929 | A1 | 8/2003 | Janssen et al. |

FOREIGN PATENT DOCUMENTS

| | | |
|---|---|---|
| JP | 7038957 | 2/1995 |
| JP | 7274253 | 10/1995 |
| JP | 2000124985 | 4/2000 |
| JP | 2001313730 | 11/2001 |
| WO | WO0062576 | 10/2000 |
| WO | WO0215617 | 2/2002 |

OTHER PUBLICATIONS

US Search Report dated May 22, 2003.

SIMULTANEOUS NATIONWIDE UPDATE OF DATABASE INFORMATION ON MOBILE COMMUNICATIONS DEVICES

Matter enclosed in heavy brackets [ ] appears in the original patent but forms no part of this reissue specification; matter printed in italics indicates the additions made by reissue.

BACKGROUND

The present disclosure relates to mobile communications and, in particular, to a method and apparatus for providing updates of database information to mobile communications devices. It is typical for mobile communications devices, such as, for example, cellular telephones, to maintain a database of information on the device itself. This database typically includes contact names and associated telephone numbers, as entered by the user.

Unfortunately, it is difficult to enter database information into a typical cellular telephone because the keypad is not well suited for text entry. In addition, it is difficult for businesses or families with several telephones to keep multiple databases synchronized for all telephones.

Some approaches may allow a user to keep a database on a personal computer ("PC"), for example, and then to download the database to a telephone having a universal serial bus ("USB") and/or a parallel port connection. Although this may simplify data entry, it does not solve the problem of keeping multiple telephone databases synchronized since the database still has to be downloaded manually and individually to each telephone. In addition, this is not a convenient solution for companies with user telephones located remotely, such as throughout the nation, for example.

SUMMARY

These and other drawbacks and disadvantages of the prior art are addressed by a system and method for supporting updates of database information to mobile communications devices.

The system includes a data entry computer for compiling database contact information for a group of mobile communications devices, a service provider computer server in signal communication with the data entry computer for uploading the database contact information into the service provider computer server and for downloading the database contact information substantially simultaneously to the group of mobile communications devices, and a mobile communications device in signal communication with the service provider computer server for receiving the database contact information and for updating its own global logical database.

The corresponding method includes the steps of compiling database contact information for a group of mobile communications devices, uploading the database contact information to a service provider computer server, and downloading the database contact information to the group of mobile communications devices.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a method and apparatus for providing updates of database information to mobile communications devices in accordance with the following exemplary figures, in which.

DETAILED DESCRIPTION OF PREFERRED EMBODIMENTS

The present disclosure relates to the update of database information for mobile communications devices. In particular, embodiments of the present disclosure store the database remotely, such as on a server maintained by a service provider. An important advantage is that multiple mobile telephones and/or communications devices can have their databases updated substantially simultaneously regardless of their physical location.

Figure 1:
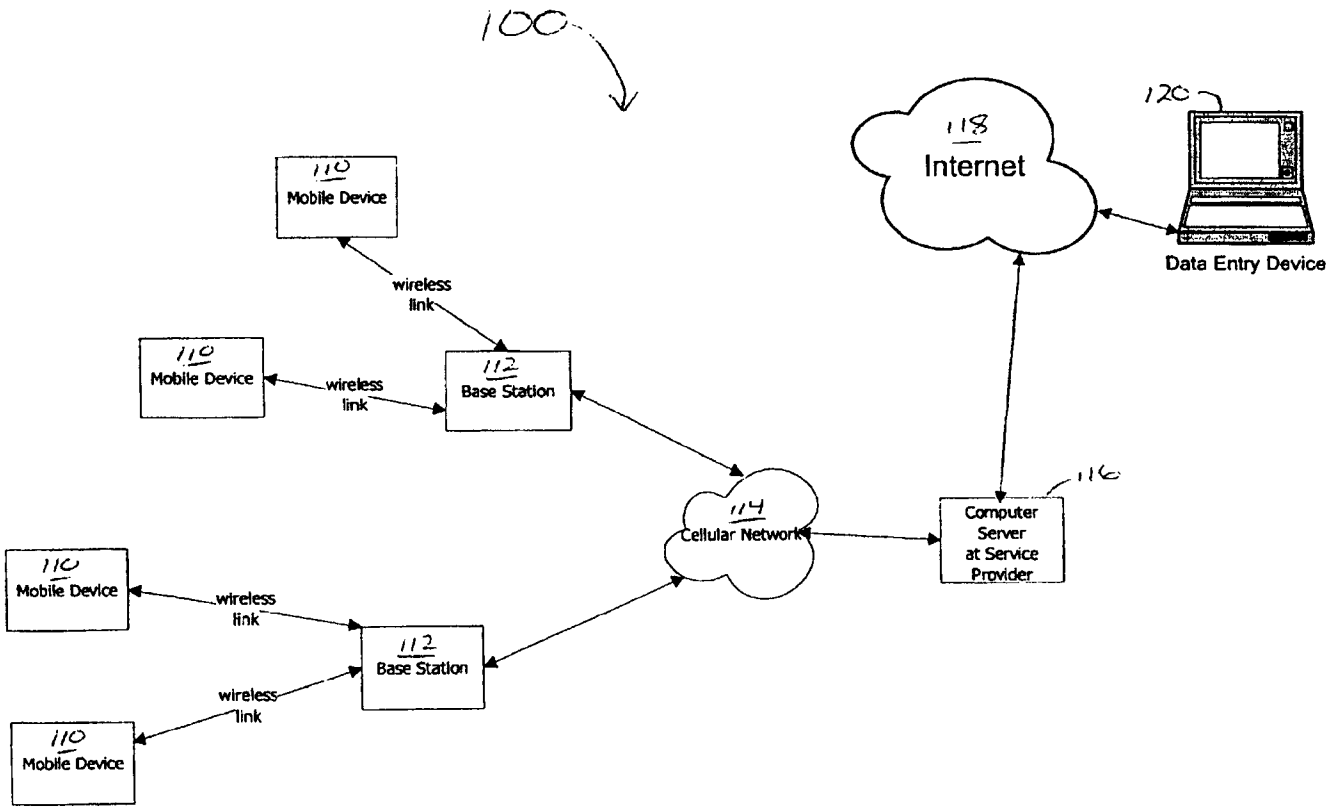
FIG. 1 shows a block diagram for a mobile communications system according to an illustrative embodiment of the present disclosure.

As shown in FIG. 1, a mobile communications system 100 includes mobile devices 110, such as, for example, mobile cellular telephones. The mobile devices 110 are each connected in signal communication to a base station 112 via the customary wireless links. Each base station 112, in turn, is connected in signal communication with a cellular network 114. A computer server 116, such as, for example, a server residing with a cellular service provider, is connected in signal communication with the cellular network 114. The computer server 116 is further connected in signal communication with an internet 118 in this exemplary embodiment. A data entry device or computer 120 is connected in signal communication with the computer server 116 via the internet 118. Thus, a communications path is formed between each mobile device 110 and the computer server 116, and a communications path is also formed between the data entry computer 120 and the computer server 116.

Figure 2:
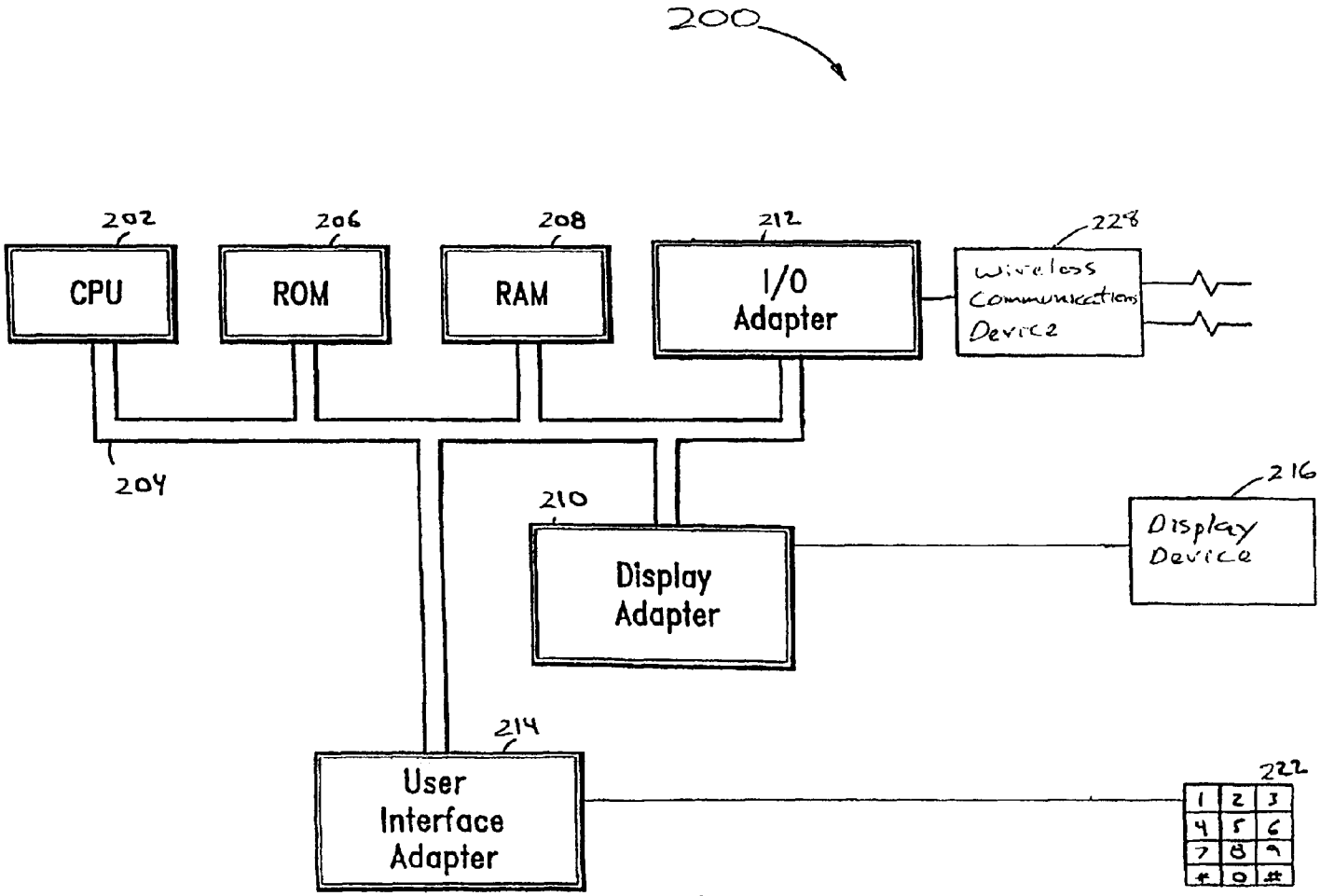
FIG. 2 shows a block diagram for a mobile communications device usable in accordance with the system of FIG. 1.

Turning to FIG. 2, a mobile communications device is generally indicated by the reference numeral 200. The mobile communications device 200 may be embodied, for example, in a mobile cellular telephone according to embodiments the present disclosure. The mobile device 200 includes at least one processor or central processing unit ("CPU") 202 in signal communication with a system bus 204. A read only memory ("ROM") 206, a random access memory ("RAM") 208, a display adapter 210, an input/output ("I/O") adapter 212, and a user interface adapter 214 are also in signal communication with the system bus 204.

A display unit 216 is in signal communication with the system bus 204 via the display adapter 210, and a keypad 222 is in signal communication with the system bus 204 via the user interface adapter 214. The system 200 also includes a wireless communications device 228 in signal communication with the system bus 204 via the I/O adapter 212, or via other suitable means as understood by those skilled in the art.

As will be recognized by those of ordinary skill in the pertinent art based on the teachings herein, alternate embodiments are possible, such as, for example, embodying some or all of the data or program code in registers located on the processor 202.

Figure 3:
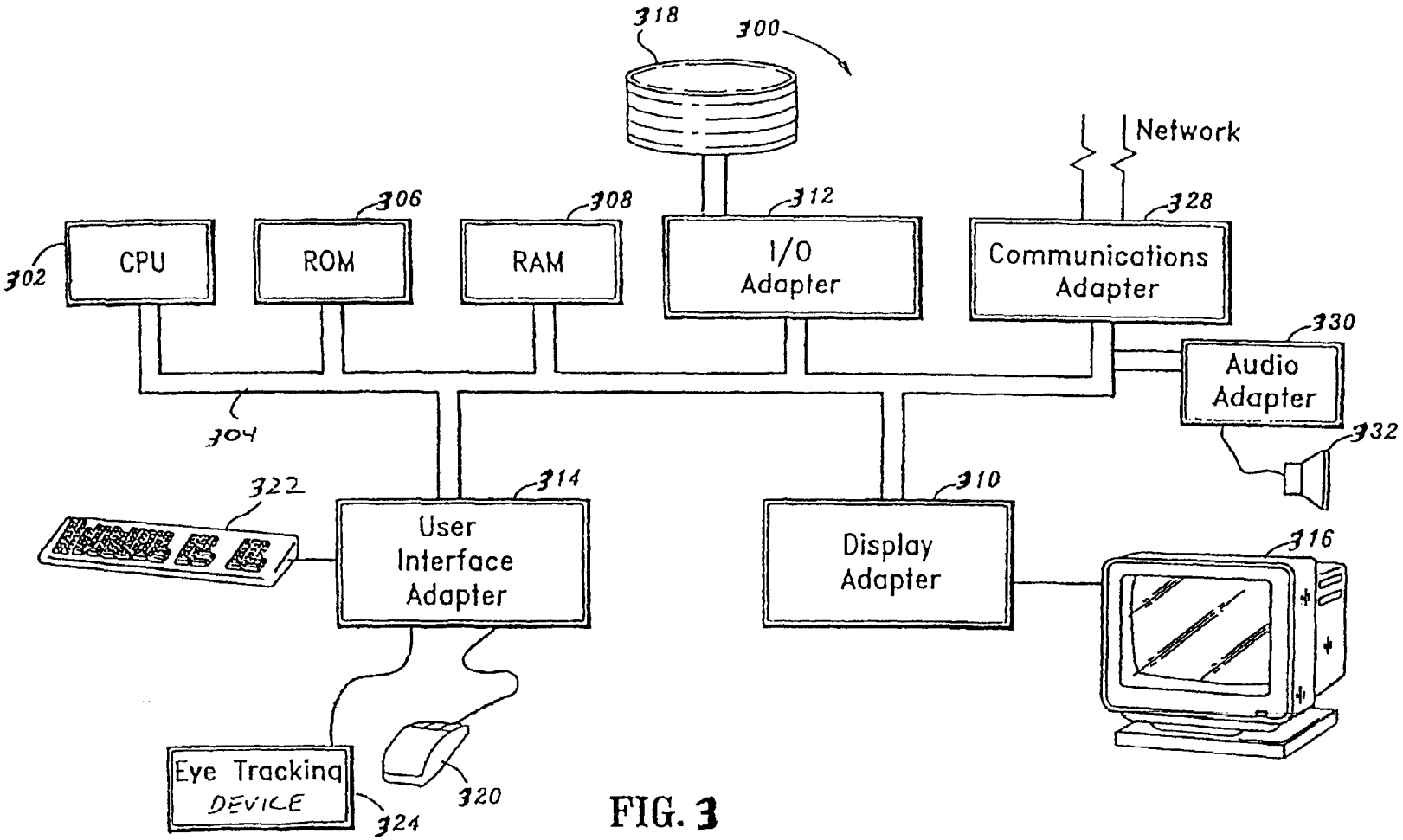
FIG. 3 shows a block diagram for a service provider computer server usable in accordance with the system of FIG. 1.

Turning now to FIG. 3, a service provider computer server is indicated generally by the reference numeral 300. The server 300 includes at least one processor or CPU 302 in signal communication with a system bus 304. A ROM 306, a RAM 308, a display adapter 310, an I/O adapter 312, and a user interface adapter 314 are also in signal communication with the system bus 304.

A display unit 316 is in signal communication with the system bus 304 via the display adapter 310. A data storage unit 318, such as, for example, a magnetic or optical disk storage unit or database, is in signal communication with the system bus 104 via the I/O adapter 312. A mouse 320, a keyboard 322, and an eye tracking device 324 are also in signal communication with the system bus 304 via the user interface adapter 314.

The system 300 also includes a communications adapter 328 in signal communication with the system bus 304, or via other suitable means as understood by those skilled in the art, so that data may be input to the system 300 from a network.

As will be recognized by those of ordinary skill in the pertinent art based on the teachings herein, alternate embodiments are possible, such as, for example, embodying some or all of the computer program code in registers located on the processor chip 302. Given the teachings of the disclosure provided herein, those of ordinary skill in the pertinent art will contemplate various alternate configurations and implementations of elements of the system 300 while practicing within the scope and spirit of the present disclosure.

It is to be appreciated that the database 318 may include a plurality of various information sources. Moreover, the internet 118 of FIG. 1 may include sources of information. In alternate embodiments of the present disclosure, the internet 118 may be an alternate or proprietary network or communications link.

In operation, a method for maintaining a database 318 simultaneously downloadable from a service provider computer server 116, 300 to each of a group of mobile devices 110, 200 is implemented. It is presumed that the mobile devices or cellular telephones 110, 200 have the capability to receive non-voice data such as Caller I.D. formatted data.

Database information such as a contact name and corresponding telephone number are stored on the service provider computer server 116, 300 as part of a database 318. This data can be sent to the server 116, 300 by a user via the internet 118, such as, for example via a website interface, as part of a database update. This will ease the data entry process since a computer 120 having an alphanumeric keyboard, for example, can be used instead of a cellular telephone keypad 222. In addition, numbers entered into a telephone 110, 200 can be stored only on that telephone, if desired, or they can be uploaded to the database 318 via the cellular network 114 as well.

The database information can be sent to all selected telephones 110, 200 to update the information to the telephones. This can occur regardless of the location of the phones 110, 200 as long as they have cellular service. The phones 110, 200 may have two logical databases. One is a local logical database with numbers that are stored only on that phone. The other is a global and/or group logical database that stores numbers received through the download from the service provider computer server 116, 300. Contact numbers entered directly into the global logical database from the phone 110, 200 are later sent to the service provider's server 116, 300 in order to update the master database 318.

Database information 318 is sent to the phones 110, 200 using the existing Caller ID format, as known to those of ordinary skill in the pertinent art, with modified message types. This format is substantially standardized and most cellular telephones 110, 200 are already capable of processing information in the format. Although this is not the only way to implement the teachings of the present disclosure, it is a preferred embodiment that makes use of an existing standard.

The modifications needed for this embodiment are shown in Tables 1 and 2. An additional message type called Mobile Database Update has been added to Table 1 in order to inform the mobile telephone 110, 200 that the following information, comprising contact name, contact telephone number and number type, should be loaded into the telephone's local memory database 208 and/or 206 From Table 2, the embodiment makes use of the Calling Number and Calling Name parameters to send the contact's name and number to the database. In addition, a Database Number Type parameter has been added. The Database Number Type can be used, for example, to indicate whether the number is a home, business, mobile or other number.

TABLE 1

| Message Type | Message Type Value | Format |
|---|---|---|
| *Mobile Database Update* | *02 hex* | *SDMF* |
| Calling Number Delivery | 04 hex | SDMF |
| Visual Message Waiting Indicator | 06 hex | SDMF |
| Call Setup | 80 hex | MDMF |
| Service Test | 81 hex | MDMF |
| Visual Message Waiting Indicator | 82 hex | MDMF |
| Manufacturer-Specific Testing (reserved) | 4C hex to 6C hex | NONE |

Modified version of Table 14-Message Type Values in the TIA/EIA-777 specification. The line in italics represents the additional message type used for this preferred embodiment. The value of 02 hexadecimal was chosen arbitrarily from the free values, and alternative values can be chosen if desired.

TABLE 2

| Parameter Type | Parameter Type Value |
|---|---|
| Date & Time | 01 hex |
| Calling Number | 02 hex |
| Dialable Directory Number | 03 hex |
| Reason for Absence of Directory Number | 04 hex |
| Reason for Redirection (Reserved) | 05 hex |
| Call Qualifier | 06 hex |
| Calling Name | 07 hex |
| Reason for Absence of Calling Name | 06 hex |
| *Database Number Type* | *09 hex* |
| Visual Message Waiting Indicator | 0B hex |

Modified version of Table 15-Parameter Type Values in the TIA/EIA-777 specification. The line in italics is an additional value used for this preferred embodiment. The value of 09 hexadecimal was chosen arbitrarily from the free values, and alternative values can be chosen if desired.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

The teachings of the present disclosure may be implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and an output unit.

It is to be further understood that, because some of the constituent system components and steps depicted in the accompanying drawings may be implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

As will be recognized by those of ordinary skill in the pertinent art based on the teachings herein, alternate embodiments are possible. Given the teachings of the disclosure provided herein, those of ordinary skill in the pertinent art will contemplate various alternate configurations and implementations of the system while practicing within the scope and spirit of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for supporting updates of database contact information [to] *containing at least one contact name with an associated contact number on a* mobile communications devices, the method comprising:

[compiling database contact information for a group of mobile communications devices, each mobile communications device including a local database and a global database;

uploading the database contact information to a master database of a service provider computer server;

downloading the database contact information to and updating each global database of the group of mobile communications devices, wherein the database contact information comprises a plurality of contact names and an associated telephone number for each contact name;

entering database contact information directly into a mobile communications device, said mobile communications device including a local database and a global database; and enabling a user to indicate whether the entered information is to remain local or global, wherein local information is stored in the local database to be stored only on that mobile communications device and global information is stored in the global database, said global information being sent to the service provider computer server to update the master database.]

*downloading via a wireless interface of the mobile communications device database contact information contained in a master database of a service provider computer server to a global database of the mobile communications device to update the global database;*

*providing a signal path that excludes the wireless interface to enable a user to enter database contact information into the mobile communications device; and*

*providing a selectable option for entering the database contact information on the mobile communications device, the selectable option controlling whether the user entered contact information is to remain local or global, wherein local contact information is stored in a local database of the mobile communications device and global contact information is stored in the global database, the global contact information contained in the global database being responsive to a command for uploading the global contact information to the service provider computer server to update the master database.*

[2. A method as defined in claim 1 wherein said compiling is performed on a data entry computer having a full alphanumeric keyboard.]

3. A method as defined in claim 1 wherein [said] *the* uploading is performed over [an internet] *a wide area network*.

4. A method as defined in claim 1 wherein [said] *the* downloading is performed substantially simultaneously to each member of [the] *a* group of mobile communications devices.

5. A method as defined in claim 1 wherein said downloading is performed via *a* wireless [links] *interface* to each member of [the] *a* group of mobile communications devices.

6. A method as defined in claim [1] *5* wherein the group of mobile communications devices is a subset of the mobile communications devices serviced by the service provider computer server.

7. A method as defined in claim [1] *5* wherein the group of mobile communications devices is one of a plurality of groups serviced by the service provider computer server.

8. A method as defined in claim 1 wherein the database contact information further comprises a Database Number Type parameter.

9. A method as defined in claim 1, further comprising:

locally storing the entered contact information in a local logical database if the information is to be kept private;

globally storing the entered contact information in a global logical database if the information is to be shared with a group;

uploading information to be shared to the service provider computer server; and updating the database contact information for the group to reflect the uploaded information to be shared.

10. A method as defined in claim 9 wherein said entering is performed manually via a keypad.

11. A method as defined in claim 9 wherein said entering is performed automatically in response to Caller ID information.

12. A method as defined in claim 9 wherein said globally storing requires an affirmative decision by a user.

13. A method as defined in claim 9 wherein said uploading is performed via a wireless [link] *interface*.

14. A method as defined in claim 9 wherein said uploading is performed via a cellular network.

15. A method as defined in claim 1 wherein said downloading comprises downloading a Mobile Database Update message.

16. A program storage device readable by machine, tangibly embodying a program of instructions executable by the machine to perform method steps for supporting updates of database contact information to mobile communications devices, the method steps comprising:

[compiling database contact information for a group of mobile communications devices, each mobile communications device including a local database and a global database;

uploading the database contact information to a master database of a service provider computer server;]

downloading *via a wireless interface of a mobile communications device* the database contact information [to and updating each global database of the group of mobile communications devices], wherein the database contact information comprises a plurality of contact names and an associated telephone number for each contact name;

entering database contact information directly into [a] *the* mobile communications device, [said] *the* mobile communications device including a local database and a global database; and determining whether the entered information is to remain local or global, wherein local information is stored in the local database to be stored only on that mobile communications device and global information is stored in the global database, [said] *the* global information being sent to the service provider computer server to update the master database.

17. A program storage device as defined in claim 16, the method steps further comprising:

locally storing the entered contact information in a local logical database if the information is to be kept private;

globally storing the entered contact information in a global logical database if the information is to be shared with a group;

uploading information to be shared to the service provider computer server; and updating the database contact information for the group to reflect the uploaded information to be shared.

18. A system for supporting updates of database contact information to mobile communications devices, the system comprising:

[compiling means for compiling database contact information for a group of mobile communications devices, each mobile communications device including a local database and a global database;

uploading means for uploading the database contact information to a master database of a service provider computer server;]

downloading [and updating] means for downloading the database contact information [to and updating each global database of the group of mobile communications devices] *via a wireless interface of a mobile communications device*, wherein the database contact information comprises [a plurality of] *at least one* contact [names and] *name with* an associated telephone number [for each contact name];

entering means for entering database contact information directly into [a] *the* mobile communications device, [said] *the* mobile communications device including a local database and a global database; and determining means for determining whether the entered information is to remain local or global, wherein local information is stored in the local database to be stored only on that mobile communications device and global information is stored in the global database, [said] *the* global information being sent to the service provider computer server to update the master database.

19. A system as defined in claim 18, further comprising:

locally storing means for locally storing the entered contact information in a local logical database if the information is to be kept private;

globally storing means for globally storing the entered contact information in a global logical database if the information is to be shared with a group;

uploading means for uploading information to be shared to the service provider computer server; and updating means for updating the database contact information for the group to reflect the uploaded information to be shared.

20. A system for supporting updates of database contact information to mobile communications devices comprising:

[a data entry computer for compiling database contact information for a group of mobile communications devices, each mobile communications device including a local database and a global database;

a service provider computer server in signal communication with the data entry computer for uploading the database contact information into a master database of the service provider computer server and for downloading the database contact information substantially simultaneously to each global database of the group of mobile communications devices; and]

a mobile communications device in signal communication with [the] *a* service provider computer server for receiving the database contact information and for updating its own global logical database, wherein the mobile device further comprises:

entering means for entering database contact information directly into [said] *the* mobile *communications* device;

determining means for enabling a user to determine whether the entered information is to remain local or global;

a local database for locally storing the entered contact information in a local logical database if the information is to be stored only on that mobile communications device; and a global database for globally storing the entered contact information in a global logical database if the information is to be shared with a group, wherein global information is sent to the service provider computer server to update the master database.

21. A system as defined in claim 20, further comprising:

[an internet] *a wide area network* coupled in signal communication between the data entry computer and the service provider computer server; and a cellular network coupled in signal communication between the service provider computer server and the mobile communications device.

22. A system as defined in claim 21, further comprising:

a base station coupled in signal communication between the cellular network and the mobile communications device.

23. A system as defined in claim 22, further comprising:

a wireless [link] *interface* coupled in signal communication between the base station and the mobile communications device.

24. A system as defined in claim 20, further comprising:

a plurality of mobile communications devices, each in signal communication with the service provider computer server for receiving the database contact information.

*25. A mobile communications device for supporting updates of database contact information containing at least one contact name with an associated contact number, comprising: a global database; a wireless interface for downloading database contact information contained in a master database of a service provider computer server to the global database to update contact information contained in the global database; an input for enabling a user to enter database contact information into the mobile communications device via a signal path that excludes the wireless interface; and a local database responsive to a command for selecting whether the user entered contact information is to remain local or global, wherein local contact information is stored in the local database and global contact information is stored in*

*the global database, the global database being responsive to a command for uploading the global contact information contained in the global database to the service provider computer server to update the master database in a manner to exclude the local contact information of the local database, wherein the uploaded global contact information becomes available for downloading by a mobile communications device having similar downloading capability.*

* * * * *

UNITED STATES PATENT AND TRADEMARK OFFICE

CERTIFICATE OF CORRECTION

PATENT NO. : RE44,597 E
APPLICATION NO. : 13/740332
DATED : November 12, 2013
INVENTOR(S) : Louis Robert Litwin It is certified that error appears in the above-identified patent and that said Letters Patent is hereby corrected as shown below:

In the Claims:

Column 5, line 30 - (in Claim 1, line 4), the word “devices” should read “device”

Signed and Sealed this
Eighteenth Day of February, 2014

Michelle K. Lee

Michelle K. Lee
*Deputy Director of the United States Patent and Trademark Office*